United States Patent Office 3,824,188
Patented July 16, 1974

3,824,188
HALOGEN-SUBSTITUTED AZINE COMPOUNDS AS PEROXYGEN BLEACH ACTIVATORS
Frank Fred Loffelman, Somerville, and Thomas Eugene Brady, Piscataway, N.J., assignors to American Cyanamid Company, Stamford, Conn.
No Drawing. Filed Mar. 21, 1973, Ser. No. 343,312
Int. Cl. C11d 7/54
U.S. Cl. 252—95                                10 Claims

ABSTRACT OF THE DISCLOSURE

Halogen-substituted azine compounds selected from pyrimidine, pyrazine, quinoxaline and pyridine compounds, carrying as ring substituents at least one halogen selected from chlorine, bromine or fluorine and at least one substituent selected from halogen, cyano, nitro, lower alkyl and lower alkoxy groups, are effective as bleach activators for peroxygen bleaching compositions.

---

This invention relates to bleaching compositions and more particularly to improved bleaching compositions comprising hydrogen peroxide or a hydrogen peroxide-releasing compound and, as a bleach activator for such compositions, a halogen-substituted azine compound selected from pyrimidines, pyrazines, quinoxalines and pyridines. Still more particularly, the invention relates to such improved bleaching compositions wherein the halogen-substituted azine compound is a compound having a formula selected from (I) 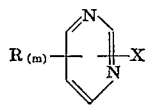

where X is chlorine, bromine or fluorine and is attached at the 2, 4 or 6 ring position; R is a halogen, cyano, nitro, lower ($C_1$–$C_5$) alkyl or lower ($C_1$–$C_5$) alkoxy group and $m$ is an integer from 1 to 3;

(II) 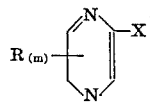

where X, R and $m$ are as defined in formula I;

(III) 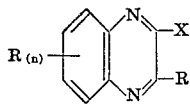

where X and R are as defined in formula I and $n$ is an integer from 1 to 4; and (IV) 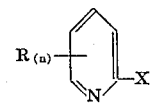

where X and R are as defined in formula I and $n$ is an integer from 1 to 4.

As typical examples of halogen-substituted azine compounds useful as bleach activators in this invention, there may be mentioned the following.

Halogen-substituted pyrimidines, such as:

2,4-dichloro-6-methoxypyrimidine,
2,6-dichloropyrimidine,
2,4,6-trichloropyrimidine,
2,4,5,6-tetrachloropyrimidine,
2-chloro-4,6-dimethoxypyrimidine,
2,4-dimethoxy-6-chloropyrimidine,
2,4-dimethyl-6-chloropyrimidine,
2,4-dichloro-6-butylpyrimidine,
2,4-dichloro-5,6-dimethoxypyrimidine,
2,4-dichloro-6-cyanopyrimidine,
2,4-dimethoxy-6-bromopyrimidine,
2,4-dichloro-6-nitropyrimidine,
2,4-difluoro-6-methoxypyrimidine, and
2,4-dibutoxy-6-chloropyrimidine.

Halogen-substituted pyrazines, such as:

2,6-dichloropyrazine,
2-chloro-6-methoxypyrazine,
2-chloro-3,5,6-trimethoxypyrazine,
2-bromo-6-propoxypyrazine,
2-fluoro-6-propoxypyrazine,
2-chloro-6-methylpyrazine,
2-chloro-6-butylpyrazine, and
2-chloro-6-nitropyrazine.

Halogen-substituted quinoxalines, such as:

2,3-dichloroquinoxaline,
2-chloro-3-methylquinoxaline,
2,3-dichloro-6,7-dimethoxyquinoxaline,
2-chloro-3-butoxyquinoxaline,
2-bromo-3,6,7-trimethylquinoxaline, and
2-chloro-3-nitroquinoxaline.

Halogen-substituted pyridines, such as:

2-chloro-3-cyano-6-methylpyridine,
2-chloro-3-cyano-6-methoxypyridine, and
2-bromo-3-cyano-6-methylpyridine.

The bleaching compositions of the invention contain the activating compound and the hydrogen peroxide-releasing compound in a molar ratio ranging from about 1:1 to about 1:10, respectively, with a preferred range of about 1:1 to 1:3. The actual ratio of activator to bleach can, of course, be varied widely for varying applications.

The oxygen bleaches useful in these bleaching compositions are hydrogen peroxide and organic peroxides and inorganic peroxygen salts that liberate hydrogen peroxide in water. Examples of peroxide bleaching compounds are urea peroxide, benzoyl peroxide, methyl ethyl ketone peroxide, and the like. Examples of inorganic peroxygen bleaching compounds are alkali metal perborates, percarbonates, perphosphates, persulfates, monopersulfates, and the like. Mixtures of two or more bleaching compounds can, of course, be used if desired.

Although the various peroxide releasing compounds as mentioned above may be used in the compositions of the invention, preferred peroxide-releasing compounds are sodium perborate (for economic considerations) and sodium percarbonate (for ecological considerations).

The activated bleach compositions of the invention are useful for bleach applications for various substrates including fabrics, particularly when incorporated with detergent compositions for household or commercial laundering purposes. A most important property of such detergent compositions is the ability to remove stains including food stains such as those of coffee, tea, wine and the like as well as to maintain purity of white in uncolored textiles. Aside from food stains, soiling in general may be removed such as grass stains, urine stains and the like.

In addition to the detergent, peroxygen-releasing compound and peroxygen bleach activator, such detergent compositions may contain other optional additives such as germicides, fungicides, enzymes, optical brighteners, colorants, perfumes, thickeners, emulsion or suspension stabilizers, and the like, including "builders," such as sodium phosphate, salts, carbonates, silicates, and the like as usually encountered in the art.

The detergent component of such activated bleach compositions may be any of the conventional types such as anionic, cationic, nonionic or amphoteric.

Examples of typically suitable anionic detergents include the alkali metal or alkaline earth metal salts of higher alkylbenzene sulfonates, olefin sulfonates, higher alkyl sulfates and higher fatty acid monoglyceride sulfates.

Examples of typically suitable cationic detergents include tetraalkyl ammonium salts in which one of the alkyl groups contains approximately 12 to 18 carbons such as dodecyl-trimethylammonium chloride or ethyldimethyl-octadecylammonium methosulfate.

Examples of suitably typical amphoteric detergents are those detergent compounds possessing both cationic and anionic sites and include, for example, amino fatty acids such as dimethylaminopropionic acid and iminodifatty acids such as methyliminodilauric acid.

Examples of typical nonionic detergents include polyglycol ethers of alkanol amides of higher fatty acids and also polyglycol ethers of higher alkanols and higher fatty acids.

Bleaching compositions may generally be used also for their germicidal properties in various applications for control of microbial growth. Applications may be made to any surface or substrate where such control is desired.

The treatment of swimming pool water and swimming pool surfaces with the compositions of the invention is especially efficacious since the usually lower temperatures of these environments prevent effective use of other antimicrobial agents. A related utility is the treatment of water supplies to render the same fit for human consumption or for industrial use, such as the sanitization of field water for consumption by military personnel or the treatment of industrial process water so it can be reused in industrial processes or by the surrounding community. The compositions also may be employed in admixture with detergents for use as home or industrial germicidal detergents, or in hair bleaching compositions containing peroxygen compounds.

The following examples will serve to illustrate the invention.

EXAMPLE 1

Preparation of 2,4-dichloro-6-methoxypyrimidine and 2-chloro-4,6-dimethoxypyrimidine (A) Trichloropyrimidine (10 g., 0.06 mole), sodium bicarbonate (10 g., 0.12 mole), and 75 ml. methanol containing 10 ml. water were refluxed for four hours. The resulting solid was filtered and dried. The dried solid was triturated with about 100 ml. 30–60° petroleum ether, filtered and the filtrate evaporated to 20 ml. On cooling, 2.5 g. 2,4-dichloro-6-methoxypyrimidine was obtained, m.p. 48–50° C.

(B) The insoluble material obtained above following treatment with petroleum ether was again triturated with petreoleum ether and filtered, giving 1.2 g. 2-chloro-4,6-dimethoxypyrimidine, m.p. 66–68° C.

EXAMPLE 2

Preparation of 2-chloro-3-cyano-6-methylpyridine 2-hydroxy-6-methylnicontinonitrile (38.2 g. 0.284 mole) was added to 135 g., 0.88 mole of phosphorous oxychloride to form a thick slurry which became readily stirrable at 60° C. The reaction mixture was then heated to 100–102° C. and maintained for 2 hours. The mixture was then drowned into 625 ml. rapidly stirred water, and the resulting product filtered, washed with water and dried to give 39.6 g. pale tan product.

EVALUATION OF COMPOUNDS AS BLEACH ACTIVATORS

The componds of Examples 1 and 2, plus additional commercial compounds (Examples 3–5), were evaluated as activators applied with a detergent and sodium perborate. In the tests, the mole ratio of activator used to sodium perborate was 1:1.1, although, depending on the result, the ratio was sometimes varied to a lesser amount of the activator.

The test procedure was as follows: Five-gram swatches of desized, 80 x 80 cotton fabric are stained with tea in the following manner. Five tea bags are placed in one liter of water and boiled for five minutes. The swatches are then immersed in the tea and the boiling is continued for another five minutes. The swatches are then removed from the tea, wrung out, dried at 200–215° F., rinsed in cold water and again dried.

Two of the stained cotton swatches are placed in a stainless steel Terg-O-Tometer, a test washing machine, manufactured by U.S. Testing Company and used in the detergent trade for evaluation purposes. Forty grams of unstained cotton fabric and one liter of distilled water at 120° F. are then added so as to provide a typical household washing machine water to cloth ratio of about 20:1. There are then added 2.0 grams of "Tide" (an anionic alkylaryl sulfonate type detergent), 0.33 gram of anhydrous sodium perborate (or an equivalent of hydrated material) and the indicated amount of the activator compound. The Terg-O-Tometer is operated at 100 cycles per minute for fifteen minutes at a temperature of 120° F. The swatches are then removed, rinsed with cold water, and dried at room temperature.

Reflectance readings on the swatches are taken both before and after laundering using a Hunter Model 25–M Reflectometer with a blue filter. The swatches are backed with a white porcelain plate and read once on each side. Fluorescent effect is excluded from all readings.

The reflectance readings are averaged and the percent stain removal is obtained in accordance with the following formula in which R is the symbol for reflectance:

$$\text{Total percent stain removal} = \frac{R \text{ (bleached) minus } R \text{ (stained)}}{R \text{ (unstained) minus } R \text{ (stained)}} \times 100$$

Control runs are also made for each set or series of evaluation tests using detergent and sodium perborate with no activator. The percent stain removed may vary somewhat on the control due to variations in the cloth and the tea used to produce the stains.

The test results are shown in Table I.

TABLE I

| Example No. | Activator | Percent stain removed (control) | Wt. (g.) activator | Percent stain removed |
|---|---|---|---|---|
| 1(A) | 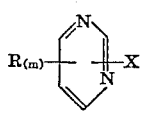 | 41.0 | 0.27<br>0.54 | 46.2<br>48.0 |
| 1(B) | 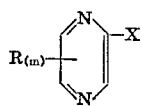 | 41.0 | 0.45 | 48 |
| 2 | 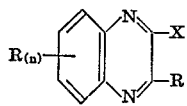 | 30.5 | 0.46 | 39.0 |
| 3 | 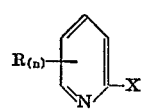 | 30.5 | 0.55 | 45.2 |
| 4 | 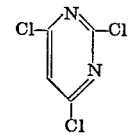 | 38.8 | 0.30<br>0.60 | 43.8<br>44.9 |
| 5 | 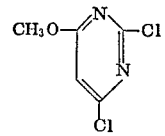 | 27.1 | 0.45 | 34.9 |

We claim:

1. A bleaching composition consisting essentially of hydrogen peroxide or a hydrogen peroxide-releasing compound and an activating amount of a halogen-substituted azine compound having a formula selected from:

(I)

$$R_{(m)} \longrightarrow \bigcirc \longrightarrow X$$

where X is chlorine, bromine or fluorine and is attached at the 2, 4 or 6 ring position; R is a halogen, cyano, nitro, lower alkyl or lower alkoxy group and $m$ is an integer from 1 to 3;

(II)

$$R_{(m)} \longrightarrow \bigcirc \longrightarrow X$$

where X, R and $m$ are as defined in formula I;

(III)

$$R_{(n)} \longrightarrow \bigcirc \longrightarrow X, R$$

where X and R are as defined in formula I and $n$ is an integer from 1 to 4; and (IV)

$$R_{(n)} \longrightarrow \bigcirc \longrightarrow X$$

where X and R are as defined in formula I and $n$ is an integer from 1 to 4.

2. A composition according to Claim 1 wherein the mole ratio of the halogen-substituted azine compound to the hydrogen peroxide-releasing compound is from about 1:1 to about 1:10.

3. A composition according to Claim 1 wherein the hydrogen peroxide-releasing compound is sodium perborate or sodium percarbonate.

4. A composition according to Claim 3 wherein the halogen-substituted azine compound is represented by the formula

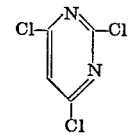

5. A composition according to Claim 3 wherein the halogen-substituted azine compound is represented by the formula

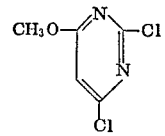

6. A composition according to Claim 3 wherein the halogen-substituted azine compound is represented by the formula

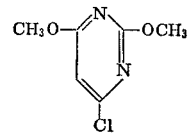

7. A composition according to Claim 3 wherein the halogen-substituted azine compound is represented by the formula

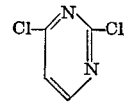

8. A composition according to Claim 3 wherein the halogen-substituted azine compound is represented by the formula

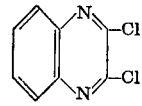

9. A composition according to Claim 3 wherein the halogen-substituted azine compound is represented by the formula

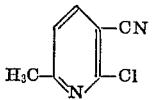

10. A composition according to Claim 1 containing a detergent.

References Cited
UNITED STATES PATENTS
3,332,882  7/1967  Blunbergs et al. _____ 252—186

MAYER WEINBLATT, Primary Examiner

U.S. Cl. X.R.
252—96, 99, 186